May 2, 1967
O. G. OSWOLD
3,317,268
SCANNING LIGHT SPOT PROJECTOR AND COUPLED RECORDING DEVICE FOR VISUAL FIELD TESTING
Filed March 28, 1962
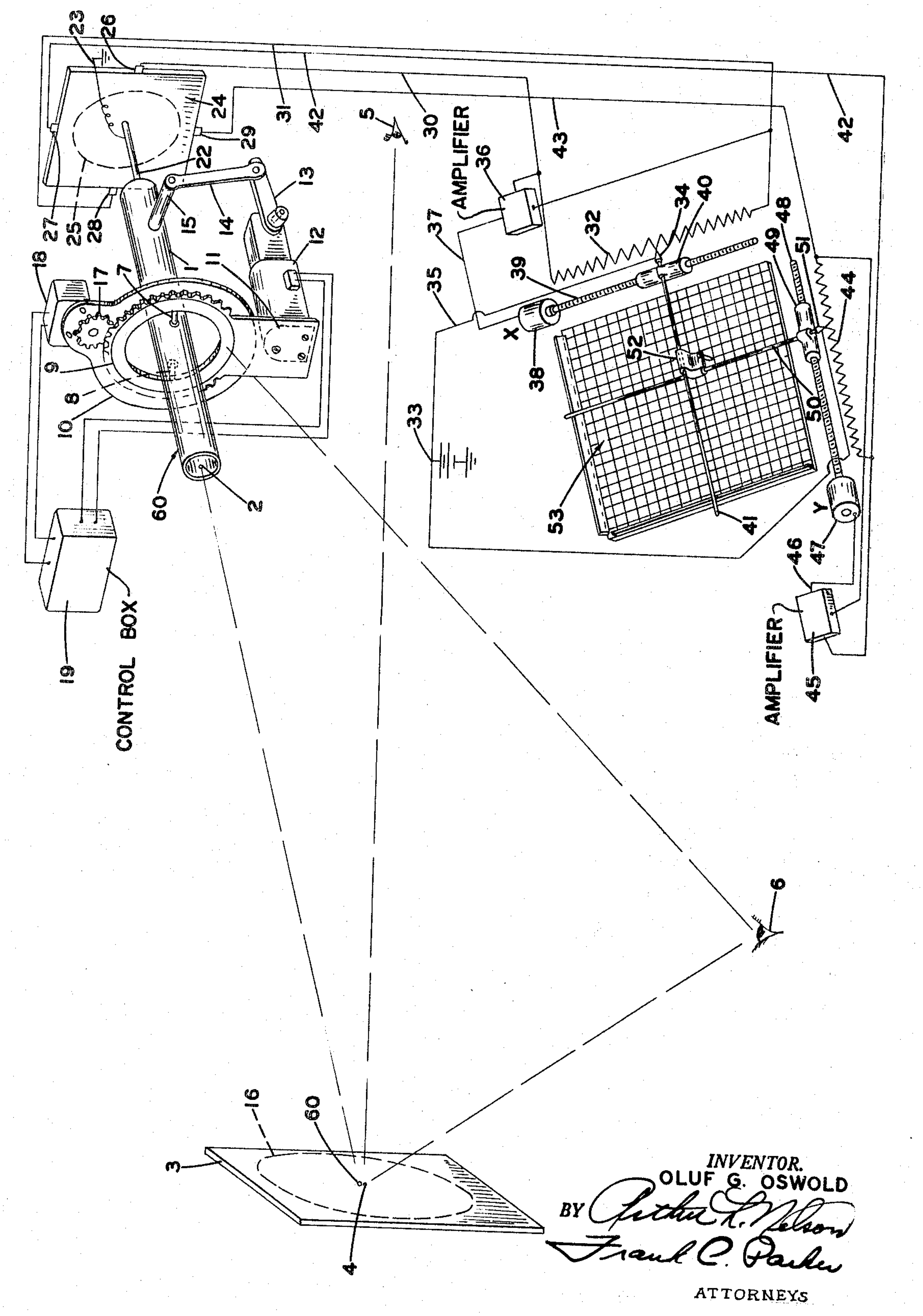
INVENTOR.
OLUF G. OSWOLD
BY Arthur L. Nelson
Frank C. Parker
ATTORNEYS

United States Patent Office 3,317,268

Patented May 2, 1967

3,317,268

SCANNING LIGHT SPOT PROJECTOR AND COUPLED RECORDING DEVICE FOR VISUAL FIELD TESTING

Oluf G. Oswold, Canadice, N.Y., assignor to Bausch & Lomb Incorporated, Rochester, N.Y., a corporation of New York Filed Mar. 28, 1962, Ser. No. 183,293
3 Claims. (Cl. 351—30)

This invention relates to a recording system and more particularly to a recording system for recording visual defects during an optical examination.

It is difficult to permanently record visual information received from a scanning device. A special need for this type of a device is in the field of optical examination where visual field deficiencies are to be recorded to make an actual determination of the visual acuity of the eye being examined.

This invention relates to a scanning device and a means for recording visual observation as the scanning device covers a predetermined field. The movement of the scanning device is recorded through a self balancing bridge network which records the information through a graphic recording mechanism.

It is an object of this invention to provide a scanning and recording system which makes a permanent record of information derived from the scanning system.

It is another object of this invention to provide a self-balancing bridge network and recording system to record information derived from a scanning system.

It is a further object of this invention to provide a self-balancing bridge network and recording system for recording visual defects detected during an optical examination.

The objects of this invention are accomplished by providing a means of scanning a screen with a spot in a predetermined manner. The movement of the spot controls the movement of a contact over a resistance plate which operates as the primary resistor in a self balancing bridge network. The secondary resistors of the bridge network are connected to a recording device which in turn operates motors to record the prescribed information. The motors control movement of a stylus and also move sliders on slide wires which operate as a self balancing recording arrangement. In this manner any defect in the eye examined may be directly recorded for a permanent record by the recording instrument.

Further objects and advantages of the invention will be apparent from the following description of the device forming a specific embodiment thereof and illustrated in the appended drawing.

The single figure of the drawing illustrates a schematic diagram of the scanning device and the self balancing bridge network connected to the recording instrument.

Referring to the drawing the scanning device projects a beam of light on the screen. The patient fixes the eye at a point on the screen and indicates to the operator when his vision fails to perceive the spot on the screen. This point of defect on the retina of the eye is then recorded through the self balancing bridge network through the recording system.

The scanning device is positioned immediately above the point of observation of the patient. The scanning device includes a projector 1 which includes a source of illumination operating through a lens system to project a beam of light from the aperture 2. The center of the field of scanning is the point 4 on the screen 3. The eye 5 of the patient is fixed on the point 4 during the visual observation.

The schematic diagram is drawn to illustrate the forward side of the screen and the scanning device as viewed from the point 6 to more clearly set forth the operation of the scanning device.

The projector 1 is pivotally mounted on the pins 7 and 8. The pins 7 and 8 are pivotally supported by the ring gear 9 which is rotatably mounted in the base 10. The ring gear 9 is formed with an arm 11 extending downwardly to support the motor 12. The motor pivotally oscillates the lever 13 which is pivotally connected to the link 14. The link 14 is pivotally connected to the pin 15 on the projector 1. As the motor 12 is in operation the lever 13 oscillates to create a pivotal movement of the projector 1 on the pins 7 and 8. The degree of pivotal movement and also the scan on the screen is controlled, and generally conforms to the circle 16 on the screen 3. The operation of the motor 12 pivots the projector in such a manner that the spot scans the surface diametrically from one extreme of the circle to the diametrically opposite extreme through the point 4.

To provide a complete scanning of the surface enclosed within the circle 16, the ring gear 9 is rotated by the pinion 17. The pinion 17 is rotated by the motor 18 which is electrically connected to the control box 19 which includes a source of electric energy. The scanning is complete with a rotation of 180° of the ring gear 9. The rotation of the ring gear 9 and the oscillation of the projector 1 caused by the motor 12 may be automatically controlled to scan the full field within the circle 16 or manually controlled whichever may be suitable to the operator of the device.

The scanning of the field within the circle 16 is correlated through the contact 22 to the self balancing bridge network. The contact 22 is connected by the lead 23 to a ground potential. The bridge network includes primary resistance means comprising the plate 24. The plate 24 has a surface 25 which engages the contact 22. The contact 22 preferably is spring biased to maintain an even pressure on the surface 25 during movement.

The plate 24 operates as two primary resistors in the bridge network. Electric energy enters the plate through the ground connection to the contact 22. The plate 24 has a predetermined resistance and is connected through the terminals 26, 27, 28 and 29 to the secondary resistors in the self balancing bridge network. The horizontal terminals 26 and 28 are considered the $x$ axis on the recording mechanism. The terminals 26 and 28 are connected through the conductors 30 and 31 respectively to the $x$ axis secondary resistor 32. The $x$ axis secondary resistor 32 or slide wire is connected to a source of electric energy 33 by means of the slider 34 and lead wire 35. The amplifier 36 is connected across the conductors 30 and 31 to provide amplification of the differential in potential across the conductors 30 and 31. The amplifier 36 is connected across the conductors 30 and 31 to provide amplification of the differential in potential across the conductors 30 and 31. The amplifier 36 amplifies the signal created by a differential in potential and feeds a signal through the wire 37 to the $x$ axis motor 38. The motor 38 is drivingly connected to the screw 39 which threadedly engages the inner periphery of the sleeve 40. The sleeve 40 being supported on the screw 39 provides a supporting means for the slider 34 and the rod 41.

The plate 24 operates as the $y$ axis primary resistor between the terminals 27 and 29. The conductors 42 and 43 are connected intermediate the terminals 27 and 29 and the slide wire 44, respectively. The slide wire 44 operates as the secondary $y$ axis resistor in the self balancing bridge network. The $y$ axis amplifier 45 is connected across the conductors 42 and 43 and detects a difference in potential across these conductors and amplifiers the signal which is fed through the wire 46 to the $y$ axis motor 47. The $y$ axis motor 47 is connected to the screw 48 which threadedly engages the sleeve 49. The rod 50 and slider 51 are supported on the sleeve 49. The rods 41 and 50 extend normal to each other and support the stylus 52 which engages the chart 53 at their point of intersection.

The operation of this device will be described in the following paragraphs. The scanning device 60 may be operated automatically or manually as desired by the operator. In automatic operation the motor 18 causes a rotation of the ring gear 9 through 180°. The motor 12 causes an oscillation of the arm 13 which is pivotally connected to the projector 1. The projector 1 pivots about the axis of the pins 7 and 8 causing a scanning by the beam of light forming a spot 60 on the screen 3. The amplitude of the oscillation of the spot across the screen 3 is generally confined to the circle 16 on the screen 3. The patient fixes the eye 5 on the point 4 of screen 3. By maintaining a fixed direction of observation it is possible to detect defects on the retina of the eye under observation. The patient must indicate to the operator of the device when his perception of the spot is impaired. This point is recorded through the self balancing network and the recording instrument. The rearward end of the projector 1 carries the contact 22 which is electrically connected to a neutral potential. The contact 22 engages the surface 25 of the plate 24. The plate 24 operates as the primary resistors of an $x$ and $y$ axis. The contact correlates the position of the spot on the screen with the position of the stylus 52 on the chart through the self balancing network.

The secondary resistors include the slide wire 32 which is the $x$ axis resistor and the slide wire 44 which is the secondary $y$ axis resistor which are connected to the plate 24 to correlate the position of contact 22 with the stylus 52 on the chart 53. An electrical unbalance on the plate 24 in the vertical direction between the contacts 27 and 29 will cause current to flow through the path of least resistance. If the unbalance is caused by the contact 22 being closer to the terminal 27 a greater current will flow through the conductor 42 to the source of electrical energy 33 causing a differential of potential across the amplifier 45. A differential of potential will be amplified in the amplifier 45. The difference in potential on the amplifier 45 will cause a current flow to the motor 47 thereby causing the screw 48 to turn and the sleeve 49 to move to the right and thereby equalize the resistance in either path between the contact 22 and the slider 51. The equalizing movement of the slider 51 causes a movement of the stylus 52 to correlate with the spot movement on the screen 3. A similar movement of contact 22 on the $x$ axis will cause an unbalance applying a signal on the input of the amplifier 36 and a rectifying current fed to the motor 38. When the motor 38 has caused a movement of the slider 34 to eliminate the unbalance the stylus 52 will have moved to a correlated position relative to the spot on the screen 3.

The patient must indicate to the operator when a defect in the retina is perceptible. The operator at this point records this defect on the chart 53. Any suitable means for controlling the engagement of the stylus with the chart, or control the type of mark made by the stylus on the chart would be satisfactory. In this manner a permanent record may be made of any defects or blind spots present on the eye being examined.

While the invention is thus described it is not desired to be limited to the precise details as described as changes may be readily made without departing from the spirit of the invention.

What is claimed is:

1. In a device of the character described comprising, a scanning device including a light projector adapted for projecting a spot on a screen for visual observation, means causing said spot to sweep in a predetermined manner across the screen, a recording device including servo-motors controlling the movement of a stylus adapted for recording information on a chart, a bridge circuit connected intermediate said scanning device and said recording device including a primary plate resistance, a pair of horizontally opposed connections on said plate, a pair of vertically opposed connections on said plate resistance, an electrical contact connected on said projector engaging a point on said plate and electrically connected to a neutral potential, resistance means in said recording device connected to the horizontal connections on said plate resistance, further resistance means in said recording device connected to the vertical connections on said plate resistance, slider elements coupled to said servo-motors and connected to a source of electrical energy and a point on each of said resistance means in said recording device providing an unbalance signal for energizing said motors to move the stylus and correlate the position of the stylus with the position of the spot projected by said projector.

2. In a device of the character described comprising, a scanning means including a light projector for projecting a beam of light adapted for forming a spot on a visual screen, a recording device having motor means for providing displacement of a stylus in response to an unbalance signal, a bridge circuit connected intermediate said scanning device including a resistance plate having two pairs of connections substantially normally disposed with respect to each other, an electrical contact fixed on said projector engaging said plate resistance intermediate said connections, mating resistance arms connected to each of said pairs of connections on said resistance plate and having slider elements coupled to said motor means providing an electrical unbalance responsive to the position of said contact on said resistance plate, said motor means responsive to the unbalance signal and displacing the stylus in response to displacement of said contact thereby correlating the stylus position of said recording device with the scan position of said projector.

3. In a device of the character described comprising, a scanning device including a light projector projecting a beam of light to form a spot on a screen for visual observation, means providing a scanning movement of the projector and the spot on said screen, a recording device including motor means adapted for displacing of a stylus for recording information on a chart, a bridge circuit including a plate resistor having horizontally opposed connections and vertically opposed connections, an electrical contact fixedly connected to said projector engaging said plate resistance, a pair of secondary resistances in said recording circuit, the first connected to the horizontal connections of said plate resistor and the second connected to the vertical connections of said plate resistor, a vertical slider and a horizontal slider engaging their mating secondary resistors and having means for applying electrical energy, said motor means being coupled to said sliders and connected to said resistors, said motor means being actuated by an unbalance signal in the bridge circuit responsive to movement of said electrical contact on said plate resistance thereby causing displacement of the stylus to correlate the stylus position with the contact position and provide a record of the movement of the spot on said screen.

References Cited by the Examiner

UNITED STATES PATENTS

| | | | |
|---|---|---|---|
| 2,564,794 | 8/1951 | Shekels | 88—20 |
| 3,071,040 | 1/1963 | Jayle | 88—20 |

DAVID H. RUBIN, *Primary Examiner.*

JEWELL H. PEDERSEN, *Examiner.*

T. L. HUDSON, *Assistant Examiner.*